United States Patent [19]
Hardtke

[11] Patent Number: 5,028,149
[45] Date of Patent: Jul. 2, 1991

[54] ROLLER BEARING FOR SUPPORTING PIPES, CONDUITS AND THE LIKE

[75] Inventor: Hans H. Hardtke, Zeven, Fed. Rep. of Germany

[73] Assignee: LISEGA GmbH, Fed. Rep. of Germany

[21] Appl. No.: 491,008

[22] Filed: Mar. 9, 1990

[30] Foreign Application Priority Data

Mar. 18, 1989 [DE] Fed. Rep. of Germany ... 8903429[U]

[51] Int. Cl.⁵ .................. F16C 29/04; F16C 13/04; F16L 3/18
[52] U.S. Cl. ......................... 384/46; 138/107; 248/55; 384/58; 384/549
[58] Field of Search ............ 138/103, 107; 248/55; 384/46, 50, 58, 416, 418, 419, 428, 444, 549, 905, 295, 296, 606

[56] References Cited

U.S. PATENT DOCUMENTS

| 2,893,669 | 7/1959 | Kindorf | 248/55 |
| 3,016,219 | 1/1962 | Murphy | 248/55 |
| 3,438,686 | 4/1969 | Stone | 384/296 |
| 4,502,653 | 3/1985 | Curtis, Jr. | 248/55 |

FOREIGN PATENT DOCUMENTS

| 73503 | 1/1932 | Sweden | 384/606 |
| 414789 | 12/1966 | Switzerland | 248/55 |

*Primary Examiner*—Thomas R. Hannon
*Attorney, Agent, or Firm*—Diller, Ramik & Wight

[57] ABSTRACT

A roller bearing for supporting pipes subject to thermal expansion which includes a mounting defined by a base plate having opposite side walls bent into generally converging relationship to each other in a direction away from the base plate, a pillow block supported from the base plate, a roller between each side wall and the pillow block, a bearing pin rotatably supporting each roller, and each bearing pin being in spanning relationship between the pillow block and an associated one of the side walls.

12 Claims, 1 Drawing Sheet

ROLLER BEARING FOR SUPPORTING PIPES, CONDUITS AND THE LIKE

BACKGROUND OF THE INVENTION

This invention relates to a roller bearing for supporting pipes, conduits and the like which are subject to thermal expansion. The invention is specifically directed to a double cylindrical roller bearing or a double conical roller bearing including a mounting for supporting the roller bearings or rollers at axially opposite ends thereof and having means for anchoring the mounting to an associated supporting surface.

Rollers bearings are customarily conventionally formed as a single roller bearing or a double roller bearing. In order to support the roller or rollers, housings or mountings are often provided in the form of opposite generally parallel side walls connected together by a bight or front wall. In such cases the various walls are welded to each other to thereby provide a closed box-like housing. This same construction is used for double roller bearings in which the side walls terminate in sloped edges so that the roller may be supported with its axis in an inclined position. In this case the front walls are welded at the inside of the housing between the side walls in an inclined position. All such bearing housings require high strength and are, therefore, formed of heavy metallic material having a high dead weight and limited space.

SUMMARY OF THE INVENTION

A primary object of the present invention is to provide a novel roller bearing, particularly a double roller bearing, which is simple in construction, is easy to mount, assemble and/or disassemble, and is constructed of only a few elements. The invention is characterized by a mounting for the rollers defined by a base plate with opposite wall portions bent at their ends and converging in a direction upwardly from the base plate. A pillow block is supported upon the base plate between the rollers for commonly supporting both rollers, one at each side of the pillow block.

A double roller bearing constructed as just described has a variety of advantages. The mounting for the rollers is formed of a single elongated plate member from which the wall portions for receiving the outer bearings/journals are formed by merely bending the metal of the plate member. Side walls, as in the case of conventional bearing housings, are not required, and this in turn reduces the weight and permits the rollers to be readily accessed from the axial ends or sides for inspection, maintenance and repair. The bearing axes at the axial ends of the rollers most adjacent to each other are journalled for rotation in a single element or pillow block, and this lends itself to simplicity of manufacturing, assembly, disassembly and maintenance. Obviously, assembly and disassembly of the rollers relative to the plate member is simplified because only the pillow block need be fastened or unfastened relative to the base plate to assemble or disassemble the rollers. Furthermore, the mounting of the double roller bearing of the invention does not require welding of any kind so the obvious disadvantages that accompany welding cannot occur.

In further accordance of the present invention, the single pillow block is preferably formed as generally a trapezoidal body with opposite faces converging generally in parallelism to the side walls of the mounting and each generally normal to one of the axes of roller rotation. This creates virtually automatic self-aligning when the rollers are mounted by the trapezoidal pillow block body to the base plate of the mounting.

The pillow block can also be secured to the base plate of the mounting by conventional screws or the like which are preferably accessible from below. This advantageously provides a safe way of securing the pillow block to the base plate while protecting against environmental deterioration. Preferably, bearing pins for the rollers are captively anchored in the common pillow block of the mounting, and this avoids any type of special securing at the outer wall portions or side walls of the base plate.

It is also in keeping with the present invention to provide bushings associated with the rollers and the bearing pins which have a collar formed thereon. The collars define bearings of the rollers and such integrally formed collars reduce the starting friction when transverse forces occur during pipe movement, expansion and/or contraction.

Finally, in order to compensate for any lateral mismatching of threaded bolt holes in the pillow block, holes for receiving fasteners in the base plate are preferably of an oblong configuration. There is, therefore, no necessity to accurately align generally circular holes of the base plate and the pillow plate for the receipt of anchoring bolts which, under many circumstances, can prove difficult if not impossible.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
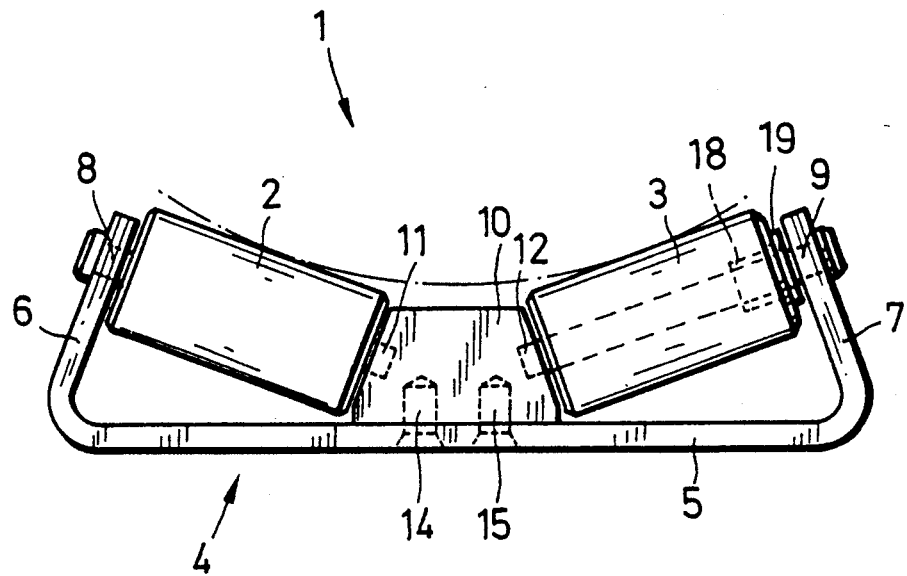
FIG. 1 is a schematic view of a roller bearing for supporting pipes, conduits and the like, and illustrates a mounting defined by a base plate having anchored thereto a pillow block and bent opposite ends into side walls or portions which in turn journal rollers in supporting relationship to the pillow block.
Figure 2:
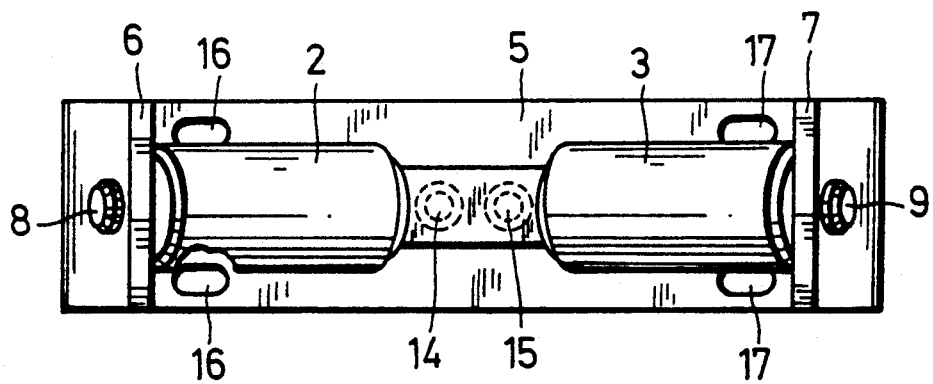
FIG. 2 is a top plan view of the roller bearing of FIG. 1.

A novel double roller bearing for supporting pipes, conduits and the like is fully illustrated in FIGS. 1 and 2 of the drawings and is generally disignated by the reference numeral 1. The double roller bearing 1 includes two cylindrical rollers 2, 3 having inclined axes which, as viewed in FIG. 1, diverge away from each other in an upward direction.

The double roller bearing 1 includes a mounting 4 defined by a base plate 5 having opposite upwardly bent side walls or side wall portions 6, 7. The side wall portions 6, 7 converge in an upward direction relative to the base plate 5, as is also readily apparent from FIG. 1. The side wall portions 6, 7 each have circular openings (unnumbered) for receiving bearings or pins 8, 9, respectively which support the respective cylinder rollers 2, 3 and define the axes of rotation thereof.

A common pillow block 10 is positioned between the rollers 2, 3. The pillow block has blind circular recesses or bores (unnumbered), and each of the latter receives a respective end 11, 12 of the pins or bearings 8, 9. Opposite side faces (unnumbered) of the pillow block 10 also converge in an upward direction, as viewed in FIG. 1, each is generally parallel with one of the associated side wall portions 6, 7, and each is also generally perpendicular to the axis of its respective bearing or pin 8, 9. These front or side faces (unnumbered) of the pillow block 10 impart a generally trapezoidal configuration thereto, but more importantly the orientation, parallelism, and geometric orientation just described provides virtually instantaneous accurate relative positioning between the rollers 2, 3 with respect to each other and with respect to the mounting 4. In other words, the angle of inclination of each of the rollers 2, 3 to a plane normal to the base plate 5 is generally identical, and the axis of each bearing or pin 2, 3 lies in a common plane which is normal to the horizontal plane of the base plate 5. Therefore, any assembly or disassembly of the rollers 2, 3 relative to the mounting 4 assures the continued geometric relationship just described.

The anchoring of the pillow block 10 at the base plate 5 of the mounting 4 is preferably effected by fastening means, such as bolts or screws 14, 15, which are accessible from the underside of the base plate 4. Since the mounting 4 rests with its base plate 5 upon a suitable supporting body (not shown), the anchoring effected by the bolts 14, 15 is largely protected against environmental damage, such as corrosion. Oblong holes 17 (FIG. 2) are provided for anchoring the base plate 5 to the underlying supporting body (not shown) with the oblong holes 17 serving to compensate for any possible lateral misplacement of associated anchoring bolts. Obviously, the holes (unnumbered) in the base plate 5 which receive the bolts 14, 15 can also be of an oblong configuration to permit slight shifting of the pillow block 10 left-to-right or right-to-left, as viewed in FIG. 1.

In further accordance with this invention, each of the rollers 2, 3 can be provided with a sleeve-like bushing 18 having a collar 19 formed on the side thereof most adjacent the side wall portion 6, 7, as is illustrated in association only with the roller 3. Obviously, a similar bushing 19 can be associated with the roller 2, and like bushings can be associated with each of the rollers 2, 3 at the axially opposite ends thereof. The integrally formed collar 19 reduces the starting friction when transverse forces occur, thereby reducing wear substantially.

While the axes of the rollers 2, 3 and the respective bearing pins 8, 9 are shown inclined, it is to be understood that the invention is also applicable to a double roller bearing in which the axes of the rollers and the bearing pins are aligned in coaxial relationship to each other and parallel to a plane of the base plate 5.

Although a preferred embodiment of the invention has been specifically illustrated and described herein, it is to be understood that minor variations may be made in the apparatus without departing from the spirit and scope of the invention, as defined in the appended claims.

It is claimed:

1. A roller bearing particularly adapted for supporting pipes subject to thermal expansion comprising a substantially homogeneous one-piece mounting, said substantially homogeneous one-piece mounting including a base plate directly joined by opposite integral bent portions to opposite side wall portions, said side wall portions being disposed in generally converging relationship to each other in a direction away from said base plate, a single pillow block supported by said base plate, a pair of rollers, said single pillow block having means for commonly supporting each of said pair of rollers in conjunction with said side wall portions, respective first and second rollers of said pair of rollers being disposed between respective first and second of said side wall portions and said single pillow block common thereto, a bearing pin rotatably supporting each roller, and each bearing pin being in spanning relationship between one of said side wall portions and said common supporting means of said single pillow block.

2. The roller bearing as defined in claim 1 wherein said single pillow block includes a pair of opposite side faces, and said side faces are in generally converging relationship to each other.

3. The roller bearing as defined in claim 1 wherein said single pillow block includes a pair of opposite side faces, said side faces are in generally converging relationship to each other, and adjacent ones of said side faces and side wall portions are disposed in generally parallel relationship to each other.

4. The roller bearing as defined in claim 1 including means for fastening said single pillow block to said base plate.

5. The roller bearing as defined in claim 1 including a bushing associated with at least one of said bearing pins and one of said pair of rollers, said bushing including a sleeve portion and a collar, said sleeve portion being disposed between said one bearing pin and said one roller, and said collar being positioned between an axial end face of said one roller and an adjacent one of said side wall portions.

6. The roller bearing as defined in claim 1 including oblong holes in said base plate adapted to receive fasteners therethrough.

7. The roller bearing as defined in claim 1 including oblong holes in said base plate adapted to receive fasteners therethrough, and said oblong holes having axes in generally alignment with the length of said base plate.

8. The roller bearing as defined in claim 1 wherein said bearing pins each define an axis of rotation of an associated roller, and said bearing pin axes lie in a common plane which is normal to a plane through said base plate.

9. The roller bearing as defined in claim 1 wherein said bearing pins each define an axis of rotation of an associated roller, and said bearing pin axes lie in a common plane.

10. The roller bearing as defined in claim 9 wherein said pillow block includes a pair of opposite side faces, and said side faces are in generally converging relationship to each other.

11. The roller bearing as defined in claim 9 wherein said pillow block includes a pair of opposite side faces, said side faces are in generally converging relationship to each other, and adjacent ones of said side faces and side wall portions are disposed in generally parallel relationship to each other.

12. The roller bearing as defined in claim 9 including a bushing associated with at least one of said bearing pins and one of said rollers, said bushing including a sleeve portion and a collar, said sleeve portion being disposed between said one bearing pin and said one roller, and said collar being positioned between an axial end face of said roller and an adjacent one of said side wall portions.

* * * * *